United States Patent [19]

Loth et al.

[11] Patent Number: 5,134,180

[45] Date of Patent: * Jul. 28, 1992

[54] USE OF NONIONIC CELLULOSE ETHERS IN JOINTING AND COATING COMPOUNDS BASED ON AQUEOUS POLYMER DISPERSIONS

[75] Inventors: Helmut Loth, Essen; Klaus Helpenstein, Moenchengladbach; Tore Podola, Monheim; Bernhard Knop, Monheim-Blee, all of Fed. Rep. of Germany

[73] Assignee: Henkel Kommanditgesellschaft auf Aktien, Duesseldorf, Fed. Rep. of Germany

[*] Notice: The portion of the term of this patent subsequent to Apr. 2, 2008 has been disclaimed.

[21] Appl. No.: 601,475

[22] Filed: Oct. 19, 1990

Related U.S. Application Data

[63] Continuation-in-part of Ser. No. 342,408, Apr. 24, 1989, Pat. No. 5,004,769.

[30] Foreign Application Priority Data

Oct. 19, 1989 [DE] Fed. Rep. of Germany ....... 3934870

[51] Int. Cl.$^5$ .................... C09D 3/48; C09D 3/18; C09D 5/02; C09K 3/10
[52] U.S. Cl. .......................................... 524/43; 524/44
[58] Field of Search ..................................... 524/43, 44

[56] References Cited

FOREIGN PATENT DOCUMENTS 339427 11/1989 European Pat. Off. .
3619142 10/1987 Fed. Rep. of Germany .
1069275 5/1967 United Kingdom .
1354436 5/1974 United Kingdom .

OTHER PUBLICATIONS

Ullmann, "Enzyklopadie der technischen chemie", 4th Edition, vol. 9, pp. 208-209.

Primary Examiner—Nathan M. Nutter
Assistant Examiner—Jeffrey Culpepper Mullis
Attorney, Agent, or Firm—Ernest G. Szoke; Wayne C. Jaeschke; Real J. Grandmaison

[57] ABSTRACT

Joint-sealing and coating compounds containing aqueous dispersions of polymers and copolymers, except for polyacrylates and acrylate copolymers, plasticizers and typical additives, such as pigments and the like, show excellent properties, particularly in regard to spreadability, smoothing behavior and resistance to spray water of uncured surfaces of these compounds providing they contain nonionic cellulose ethers selected from the group consisting of hydroxyethyl, hydorxyethyl-methyl, hydroxypropyl-methyl and hydroxypropyl cellulose having a Brookfield viscosity (2% aqueous solution at 20° C.) of at least 3,000 mPa.s.

18 Claims, 1 Drawing Sheet

USE OF NONIONIC CELLULOSE ETHERS IN JOINTING AND COATING COMPOUNDS BASED ON AQUEOUS POLYMER DISPERSIONS

This application is a continuation-in-part of U.S. Ser. No. 07/342,408, filed Apr. 24, 1989, now U.S. Pat. No. 5,004,769.

BACKGROUND OF THE INVENTION

1. Field of the Invention

This invention relates to the use of nonionic cellulose ethers selected from the group consisting of hydroxyethyl, hydroxyethyl methyl, hydroxypropyl methyl and hydroxypropyl cellulose having Brookfield viscosities (2% aqueous solution at 20° C.) of at least 3,000 mPa.s as an additive for joint-sealing and coating compounds based on aqueous dispersions of polymers and copolymers, except for polyacrylates and acrylate copolymers, for improving the spreadability, smoothing behavior and resistance to spray water of uncured surfaces of these compounds.

2. Discussion of Related Art

It is known from Ullmann, Enzyklopadie der technischen Chemie, 4th Edition, pages 208-209 that nonionic cellulose ether derivatives, such as hydroxyethyl cellulose (HEC), hydroxyethyl methyl cellulose (HEMC) and hydroxypropyl methyl cellulose (HPMC), are used in polymeric plasters for improving their water retention capacity, workable period, wet adhesion and thickening and setting behavior. In addition, German Patent 36 19 142 discloses the use of water-soluble cellulose derivatives as auxiliaries in the mechanical smoothing of uncured surfaces of paste-like materials, particularly joint-sealing compounds, for example based on polyacrylates.

After application, typical known formulations of joint-sealing and coating compounds are normally smoothed with smoothing water or mixtures of water and wetting agents, for example in accordance with German Patent 36 19 142. The use of smoothing agents enables technically and optically satisfactory connections to be established with adjoining structures and to even out imperfections in the surfaces of these materials. The accumulation of the wetting agents present in the smoothing agent causes reduction of the slip resistance on the surface of the sealant and makes slippage itself a possibility. Under certain conditions, the accumulation of wetting agents results in the emulsification of formulation ingredients at the surface of the compounds. Since this alters the composition of the compound at the surface, the performance properties of the sealants can be adversely affected. The depletion of constituents of the compound at the surface can also have a detrimental effect.

DESCRIPTION OF THE INVENTION

Other than in the operating examples, or where otherwise indicated, all numbers expressing quantities of ingredients or reaction conditions used herein are to be understood as modified in all instances by the term "about".

The present invention relates to joint-sealing compounds and coating compounds which besides having excellent properties such as modulus of elasticity, elongation break, and resetting ability, have an improved overall smoothing behavior and simultaneously have a considerably improved resistance to migration or wash-out of formulation ingredients at the surface of the compounds by comparison with known formulations. This is achieved by the use of nonionic cellulose ethers selected from the group consisting of hydroxyethyl, hydroxyethyl-methyl, hydroxypropyl-methyl and hydroxypropyl cellulose having a Brookfield viscosity (2% aqueous solution at 20° C.) of at least 3,000 mPa.s as additives for joint-sealing and coating compounds based on aqueous dispersions of polymers and copolymers, except polyacrylate or acrylate copolymers, to improve the spreadability, smoothing behavior and resistance to spray water of uncured surfaces of these compounds.

A practical upper limit to the viscosity of the above-mentioned cellulose ethers is 100,000 mPa.s, a viscosity in the range from 3,000 to 20,000 mPa.s (Brookfield, 20° C., 2% aqueous solution) being preferred.

Another significant and unexpected advantage of the joint-sealing and coating compounds according to the invention lies in their so-called "wash-out" behavior, i.e. after application and before curing, the compound shows prolonged resistance even to the effect of spray water, for example rain water.

In one advantageous embodiment of the invention, the dispersions to be used are dispersions of film-forming polymers or copolymers selected from the group consisting of ethylene-vinyl acetate, butadiene-styrene, vinyl acetate-maleic acid ester, silicone, urethane, vinyl acetate, methacrylic acid-chloroprene and isoprene polymers and copolymers.

In another advantageous embodiment of the invention, the aqueous dispersions are aqueous dispersions of polysulfide polymers.

The invention also relates to joint-sealing compounds and coating compounds comprising a) an aqueous dispersion of polymers and copolymers except for polyacrylates and acrylate copolymers, b) a nonionic cellulose ether selected from the group consisting of hydroxyethyl, hydroxyethyl-methyl, hydroxypropyl-methyl and hydroxypropyl cellulose having a Brookfield viscosity in a 2% aqueous solution at 20° C. of at least 3,000 mPa.s and, optionally, c) typical additives, such as pigments, wetting agents, plasticizers (extenders), foam inhibitors, dispersion aids, preservatives and antiaging agents.

The composition of preferred aqueous dispersions according to the invention was described in the foregoing.

In one preferred embodiment of the invention, the nonionic cellulose ethers selected from the group consisting of hydroxyethyl, hydroxyethyl-methyl, hydroxypropyl-methyl and hydroxypropyl cellulose having a Brookfield viscosity in a 2% aqueous solution at 20° C. of at least 3,000 mPa.s are present in a quantity of 0.4 to 6.0% by weight, and more preferably in a quantity of 0.6 to 5.0% by weight, based on the solids content of the dispersion.

The aqueous dispersions of polymers or copolymers present in the joint-sealing and coating compounds according to the invention preferably have a solids contents of 40 to 75% by weight and more preferably 40 to 70% by weight. Their pH value should be at least 7 and, more particularly, from 8 to 9 and, if necessary, is adjusted to those values.

In addition, the joint-sealing and coating compounds according to the invention may contain fillers in a quantity of 0 to 60% by weight and preferably in a quantity of 2 to 60% by weight, based on the total weight of the joint-sealing and coating compounds. Compounds such as these are highly transparent providing they contain very little, if any, filler.

In another advantageous embodiment according to the invention, the joint-sealing and coating compounds contain chlorinated hydrocarbons, more particularly chlorinated paraffins, as plasticizers and nonionic surfactants as wetting agents. Commercially available chlorinated paraffins having a chain length of from about 10 to 18 carbon atoms and a chlorine content of from about 40 to 70% by weight are preferred.

The aqueous dispersions of polymers or copolymers present in the joint-sealing and coating compounds and also the pigments, plasticizers, wetting agents, foam inhibitors, dispersion aids, preservatives and anti-aging agents optionally present are commercially available products which are known to the expert in the field of joint-sealing and coating compounds for building purposes.

The nonionic cellulose ethers to be used in accordance with the invention, as specified above, are also commercially available products.

The invention is explained in more detail by means of preferred embodiments in the following.

BRIEF DESCRIPTION OF THE DRAWINGS

The materials described in the examples as well as additional materials produced for comparison purposes were subjected to a wash-out test in which a sprinkling apparatus as seen in FIG. 1 was used. The same apparatus is shown in side view in FIG. 2.

DETAILED DESCRIPTION OF THE DRAWINGS

Figure 1:
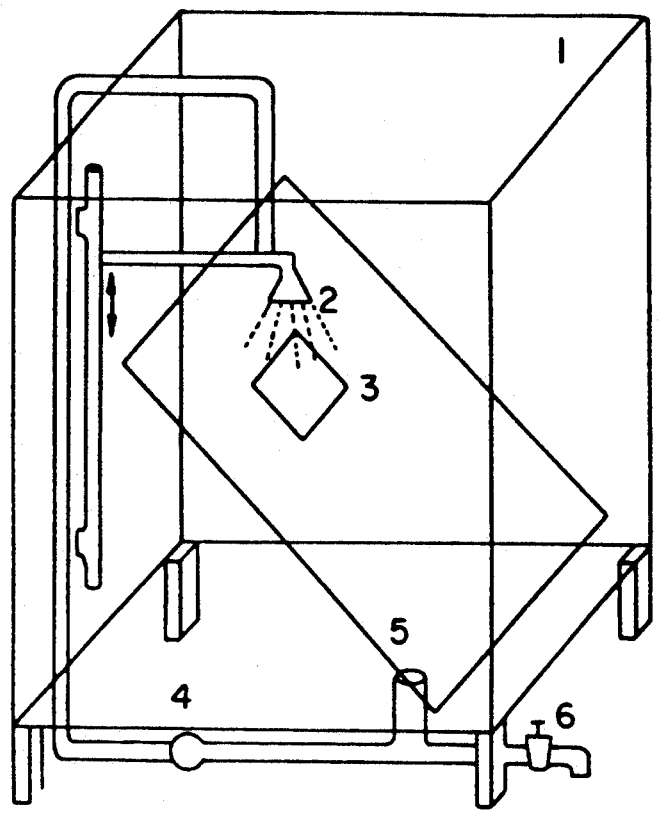
Figure 2:
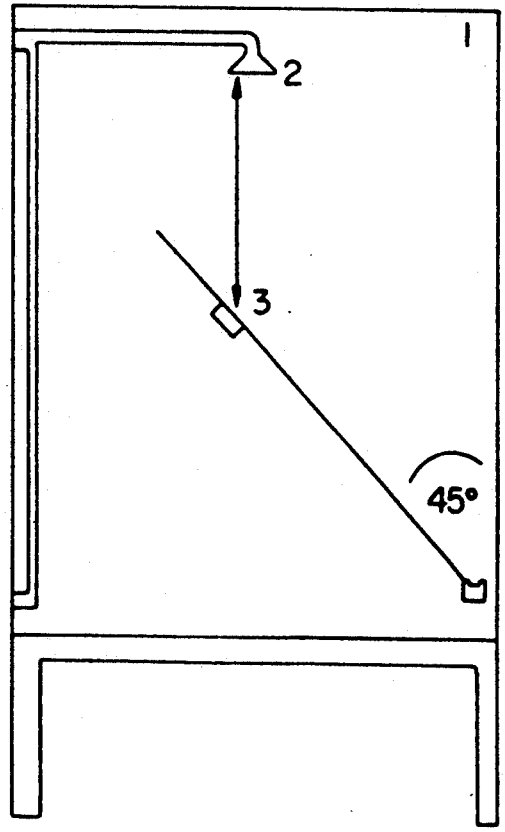

The materials described in the examples as well as additional materials produced for comparison purposes were subjected to a wash-out test in which a sprinkling apparatus as seen in FIG. 1 was used. The same apparatus is shown in side view in FIG. 2.

The water spraying apparatus consists of a housing of transparent plastic having the following dimensions: height 70 cm, width 60 cm and depth 60 cm. It comprises a housing 1, a shower head 2, a sample dish 3, a pump 4, a bottom outlet 5 and a shutoff cock 6 for the outlet. The sample dish consists of a receptacle measuring 7×7 cm for a depth of 2.5 cm. The shower head was a standard hard shower of the type used in baths and was adjusted in such a way that the sample was uniformly sprayed. The distance between the sample dish 3 and shower head 2 was 30 cm.

The water spraying apparatus was operated with demineralized water, an excess pressure of about 0.4 bar being produced by the pump. The water throughput was 300 l/h. The sample was sprayed with water for 5 minutes, in each case 1 minute after introduction and smoothing of the surface of the compounds to be tested. The wash-out (in % by weight) was the difference in weight before and after spraying with water.

The compounds described in the Examples were also tested for their smoothing behavior. This test, which involved seven independent operators, was carried out by applying a 30 cm length of compound to a smooth, flat, dark surface and then smoothing the compound thus applied with a spatula and with the fingers. The smoothing behavior was marked on a scale of 1 (=very good) to 6 (=inadequate).

EXAMPLE 1

The following constituents were intensively mixed for about 45 minutes in a planetary mixer:

1,750 g aqueous commercially available dispersion based on a copolymer of vinyl acetate and ethylene (approximately 60% solids) having a pH value of approx. 4.5 and a viscosity of approx. 1,600 mPa.s at 20° C. (trade name: Vinnapas EP 17, Wacker),
250 g chloroparaffin ($C_{12-14}$, 49% chlorine),
2,800 g barium sulfate (trade name: Schwerspat EWO),
100 g titanium dioxide (trade name: KRONOS RN 56)
25 sodium carbonate (technically pure commercial product),
25 g ethylene oxide adduct (approx. 9.5 EO) with nonylphenol,
5 g commercially available halogenated preservative,
37 g hydroxyethyl cellulose having a viscosity of approx. 100,000 mPa.s (2% aqueous solution at 20° C.) and a hydroxyethyl group content of 55% by weight (trade name: Natrosol 250 HHR).

This mixture was packed in 310 ml cartridges and remained stable in storage for at least one year at temperatures of up to 35° C.
Processability according to DIN 52 465: 2,300 g/min.
Smoothing behavior: good
Wash-out: 1% loss

EXAMPLE 2

A composition was prepared in the same way as in Example 1 except that the dispersion of the vinyl acetate-ethylene copolymer was replaced by 1,750 g of a commercially available aqueous dispersion based on a copolymer of styrene and butadiene (approximately 64% solids) having a pH value of approx. 10.5 and a viscosity of approx. 800 mPa.s at 20° C. (trade name: Polysar 2105, Hycar).

This mixture was packed in 310 ml cartridges and remained stable in storage for at least one year at temperatures of up to 35° C.
Processability according to DIN 52 465: 1,980 g/min.
Smoothing behavior: good
Wash-out: 1% loss

EXAMPLE 3

A composition was prepared in the same way as in Example 1 except that the dispersion of the vinyl acetate-ethylene copolymer was replaced by 1,750 g of a commercially available aqueous dispersion based on a copolymer of vinyl acetate and maleic acid di-n-butyl ester, solids content approx. 53%, pH value 4 to 5, viscosity (Brookfield, 20° C., 20 r.p.m.) 1,000 to 3,000 mPa.s, trade name Mowilith DM 2HB, Hoechst.

This mixture was packed in 310 ml cartridges and remained stable in storage for at least one year at temperatures of up to 35° C.
Processability according to DIN 52 465: 2,030 g/min.
Smoothing behavior: good
Wash-out: 1% loss

EXAMPLE 4

A composition was prepared in the same way as in Example 1 except that the dispersion of the vinyl acetate-ethylene copolymer was replaced by 1,750 of a commercially available aqueous silicone emulsion (drying elastically from the emulsion, approx. 45% solids)

having a pH value of approx. 5 and a density of approx. 1.0 at 20° C. (trade name: Wacker Siliconbautenschutzmittel).

This mixture was packed in 310 ml cartridges and remained stable in storage for at least one year at temperatures of up to 35° C.
Processability according to DIN 52 465: 1,790 g/min.
Smoothing behavior: good
Wash-out: 1% loss

EXAMPLE 5

A composition was prepared in the same way as in Example 1 except that the dispersion of the vinyl acetate-ethylene copolymer was replaced by 1,750 g of a commercially available aqueous dispersion of a polysulfide polymer, approx. 55% solids, pH value 9 to 10, trade name: ZW 2028, Thiokol.

This mixture was packed in 310 ml cartridges and remained stable in storage for at least one year at temperatures of up to 35° C.
Processability according to DIN 52 465: 1,790 g/min.
Smoothing behavior: good
Wash-out: 2% loss

EXAMPLE 6

A composition was prepared in the same way as in Example 1 except that the dispersion of the vinyl acetate-ethylene copolymer was replaced by 1,750 g of a commercially available aqueous dispersion of a polyurethane polymer having approx. 40% solids, pH value 7.0 to 7.5, viscosity 10,000 to 18,000 mPa.s, trade name: VP-LA 3110, Henkel.

This mixture was packed in 310 ml cartridges and remained stable in storage for at least one year at temperatures of up to 35° C.
Processability according to DIN 52 465: 1,820 g/min.
Smoothing behavior: good
Wash-out: 3% loss

EXAMPLE 7

A composition was prepared in the same way as in Example 1 except that the dispersion of the vinyl acetate-ethylene copolymer was replaced by 1,750 g of a commercially available aqueous dispersion based on polyvinyl acetate, solids content approx. 50%, pH value approx. 6 to 7, viscosity approx. 10,000 to 18,000 mPa.s (Brookfield), trade name: Mowilith DLR, Hoechst.

This mixture was packed in 310 ml cartridges and remained stable in storage for at least one year at temperatures of up to 35° C.
Processability according to DIN 52 465: 1,670 g/min.
Smoothing behavior: good
Wash-out: 1% loss

EXAMPLE 8

A composition was prepared in the same way as in Example 1 except that the dispersion of the vinyl acetate-ethylene copolymer was replaced by 1,750 g of a commercially available aqueous dispersion based on a copolymer of chloroprene and methacrylic acid, solids content approx. 46.5 to 48.5%, pH value approx. 9, trade name: Neoprene Latex 115.

This mixture was packed in 310 ml cartridges and remained stable in storage for at least one year at temperatures of up to 35° C.
Processability according to DIN 52 465: 2,030 g/min.
Smoothing behavior: good
Wash-out: 1% loss

EXAMPLE 9

A composition was prepared in the same way as in Example 1 except that the dispersion of the vinyl acetate-ethylene copolymer was replaced by 1,750 g of a commercially available aqueous dispersion based on a natural rubber latex, solids content approx. 70%, pH value approx. 9 to 10, trade name: Revertex Standard.

This mixture was packed in 310 ml cartridges and remained stable in storage for at least one year at temperatures of up to 35° C.
Processability according to DIN 52 465: 1,740 g/min.
Smoothing behavior: good
Wash-out: 1% loss

EXAMPLE 10

Examples 1 to 9 were remeasured after the hydroxyethyl cellulose used therein had been replaced by a commercially available methyl hydroxypropyl cellulose (MHPC) having a Brookfield viscosity of approx. 20,000 mPa.s (2% solution at 20° C.) and a hydroxypropyl group content of 3.2% by weight. The processabilities, as measured in accordance with DIN 52 456, were comparable. The smoothing behavior was good.

| Result: | |
| --- | --- |
| Composition acc. to Example No. but with MHPC | Wash-out loss in % |
| 1 | 1.8 |
| 2 | 1.0 |
| 3 | 1.0 |
| 4 | 1.4 |
| 5 | 2.6 |
| 6 | 3.0 |
| 7 | 1.4 |
| 8 | 1.0 |
| 9 | 1.3 |

EXAMPLE 11

Examples 1 to 9 were remeasured after the hydroxyethyl cellulose used therein had been replaced by a commercially available hydroxypropyl cellulose (HPC) having a Brookfield viscosity of approx. 5,000 mPa.s (2% solution at 20° C.) and a hydroxypropyl group content of 70% of weight. The processabilities, as measured in accordance with DIN 52 456, were comparable. The smoothing behavior was good.

| Result: | |
| --- | --- |
| Composition acc. to Example No. but with HPC | Wash-out loss in % |
| 1 | 2.2 |
| 2 | 1.9 |
| 3 | 2.3 |
| 4 | 1.3 |
| 5 | 2.0 |
| 6 | 2.5 |
| 7 | 1.0 |
| 8 | 2.0 |
| 9 | 1.0 |

COMPARISON EXAMPLE A

Examples 1 to 9 were remeasured after the hydroxyethyl cellulose (HEC) had been replaced by a commercially available aqueous polyacrylic acid dispersion (approx. 25% solids, trade name: Rohagit SD 15). The wash-out losses, as measured in accordance with DIN 52 456, were comparable. Smoothing behavior was unsatisfactory; wash-out behavior was less favorable.

| Results of wash-out test: | |
|---|---|
| Composition acc. to Example No. (without HEC, with polyacrylic acid dispersion) | Wash-out loss in % |
| 1 | 4 |
| 2 | 10 |
| 3 | 11 |
| 4 | 28 |
| 5 | 30 |
| 6 | 100 |
| 7 | 14 |
| 8 | 4 |
| 9 | 16 |
| 10 | 6 |

COMPARISON EXAMPLE B

Examples 1 to 9 were repeated without hydroxyethyl cellulose (HEC) (trade name: Natrosol 250 HR). Smoothing behavior was unsatisfactory; wash-out behavior was less favorable.

| Results of wash-out test: | |
|---|---|
| Composition acc. Example No. (without HEC) | Wash-out loss in % |
| 1 | 14 |
| 2 | 20 |
| 3 | 100 |
| 4 | 64 |
| 5 | 98 |
| 6 | 100 |
| 7 | 95 |
| 8 | 7 |
| 9 | 90 |
| 10 | 7 |

What is claimed is:

1. A joint-sealing or coating composition consisting essentially of:
   (a) an aqueous dispersion containing from about 40 to about 75% by weight of film-forming polymers or copolymers selected from the group consisting of ethylene-vinyl acetate, butadiene-styrene, vinyl acetate-maleic acid ester, silicone, urethane, vinyl acetate, methacrylic acid-chloroprene, isoprene, and polysulfide; and
   (b) from about 0.4 to about 6% by weight of a nonionic cellulose ether selected from the group consisting of hydroxyethyl cellulose, hydroxyethyl-methyl cellulose, hydroxypropyl-methyl cellulose and hydroxypropyl cellulose having a Brookfield viscosity in a 2% aqueous solution at about 20° C. of at least about 3,000 mPa.s, based on the solids content of said dispersion.

2. A joint-sealing or coating composition as in claim 1 wherein said cellulose ether has a Brookfield viscosity of up to about 100,000 mPa.s.

3. A joint-sealing or coating composition as in claim 1 wherein said cellulose ether has a Brookfield viscosity of between about 3,000 and about 20,000 mPa.s.

4. A joint-sealing or coating composition as in claim 1 including from about 2 to about 60% by weight of an additive selected from a pigment, wetting agent, plasticizer, foam inhibitor, dispersion agent, preservative and anti-aging agent, based on the weight of said composition.

5. A joint-sealing or coating composition as claim 4 wherein said plasticizer comprises a chlorinated hydrocarbon.

6. A joint-sealing or coating composition as in claim 4 wherein said wetting agent comprises a nonionic surfactant.

7. A process for the sealing of a joint or gap in a building structure, or for the coating of a surface exposed to rain or moisture comprising applying to said joint, gap or surface a composition consisting essentially of:
   (a) an aqueous dispersion containing from about 40 to about 75% by weight of film-forming polymers or copolymers selected from the group consisting of ethylene-vinyl acetate, butadiene-styrene, vinyl acetate-maleic acid ester, silicone, urethane, vinyl acetate, methacrylic acid-chloroprene, isoprene, and polysulfide; and
   (b) from about 0.4 to about 6% by weight of a nonionic cellulose ether selected from the group consisting of hydroxyethyl cellulose, hydroxyethyl-methyl cellulose, hydroxypropyl-methyl cellulose and hydroxypropyl cellulose having a Brookfield viscosity in a 2% aqueous solution at about 20° C. of at least about 3,000 mPa.s, based on the solids content of said dispersion.

8. A process as in claim 7 wherein said cellulose ether has a Brookfield viscosity of up to about 100,000 mPa.s.

9. A process as in claim 7 wherein said cellulose ether has a Brookfield viscosity of between about 3,000 and about 20,000 mPa.s.

10. A process as in claim 7 wherein said composition contains from about 2 to about 60% by weight of an additive selected from a pigment, wetting agent, plasticizer, foam inhibitor, dispersion agent, preservative and anti-aging agent, based on the weight of said composition.

11. A process as in claim 10 wherein said plasticizer comprises a chlorinated hydrocarbon.

12. A process as in claim 10 wherein said wetting agent comprises a nonionic surfactant.

13. A process for improving the workability, smoothing behavior and wash-out resistance of an unhardened surface of a joint-sealing or coating composition consisting essentially of an aqueous dispersion containing from about 40 to about 75% by weight of film-forming polymers or copolymers selected from the group consisting of ethylene-vinyl acetate, butadiene-styrene, vinyl acetate-maleic acid ester, silicone, urethane, vinyl acetate, methacrylic acid-chloroprene, isoprene, and polysulfide; comprising adding to said composition from about 0.4 to about 6% by weight of a nonionic cellulose ether selected from the group consisting of hydroxyethyl cellulose, hydroxyethyl-methyl cellulose, hydroxypropyl-methyl cellulose and hydroxypropyl cellulose having a Brookfield viscosity in a 2% aqueous solution at about 20° C. of at least about 3,000 mPa.s, based on the solids content of said dispersion.

14. A process as in claim 13 wherein said cellulose ether has a Brookfield viscosity of up to about 100,000 mPa.s.

15. A process as in claim 13 wherein said cellulose ether has a Brookfield viscosity of between about 3,000 and about 20,000 mPa.s.

16. A process as in claim 13 wherein said composition contains from about 2 to about 60% by weight of an additive selected from a pigment, wetting agent, plasticizer, foam inhibitor, dispersion agent, preservative and anti-aging agent, based on the weight of said composition.

17. A process as claim 16 wherein said plasticizer comprises a chlorinated hydrocarbon.

18. A process as in claim 16 wherein said wetting agent comprises a nonionic surfactant.

* * * * *